United States Patent [19]

Prosser et al.

[11] Patent Number: 5,350,136
[45] Date of Patent: Sep. 27, 1994

[54] NACELLE ARRANGEMENT

[75] Inventors: Harold T. Prosser, Vernon; Joseph L. Forsyth, East Hampton; Lewis J. Frost, Vernon, all of Conn.

[73] Assignee: United Technologies Corporation, Hartford, Conn.

[21] Appl. No.: 61,887

[22] Filed: May 14, 1993

[51] Int. Cl.⁵ .............. E05B 65/04; E05C 7/02; B64C 1/16
[52] U.S. Cl. .............. 244/129.4; 244/118.2; 49/67
[58] Field of Search ........... 244/54, 129.4, 129.5, 244/118.2; 60/39.31; 49/61, 67

[56] References Cited

U.S. PATENT DOCUMENTS

| | | | |
|---|---|---|---|
| 4,044,973 | 8/1977 | Moorehead | 244/54 |
| 4,549,708 | 10/1985 | Norris | 244/129.4 |
| 4,585,189 | 4/1986 | Buxton | 244/129.4 |
| 4,679,750 | 7/1987 | Burhans | 244/129.4 |
| 4,825,648 | 5/1989 | Adamson | 60/226.1 |
| 4,920,744 | 5/1990 | Garcia et al. | 60/39.31 |

FOREIGN PATENT DOCUMENTS 1002981 3/1982 France .................. 244/54

Primary Examiner—Michael S. Huppert
Assistant Examiner—Virna Lissi Ansley
Attorney, Agent, or Firm—Edward L. Kochey, Jr.

[57] ABSTRACT

An inner cowl 30 is attached to outer cowling 26. When it is opened it rotates around hinge line extension 36. Latch band 38 has an arcuate upper link 44 secured to anchor 40. A lower link 50 circumferentially slides around the cowl on opening. The latch 52 which secures the lower link is located in a lower gradient where it is visible and accessible.

3 Claims, 4 Drawing Sheets

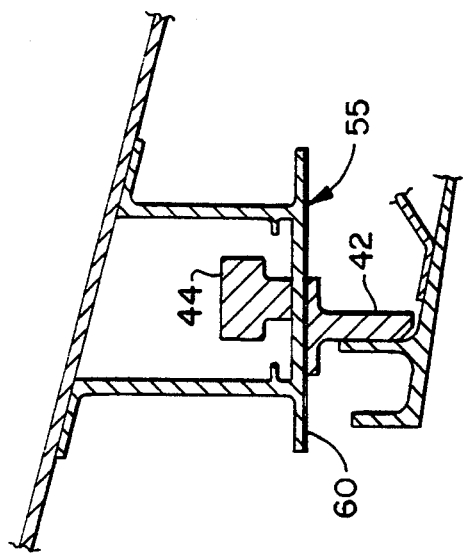
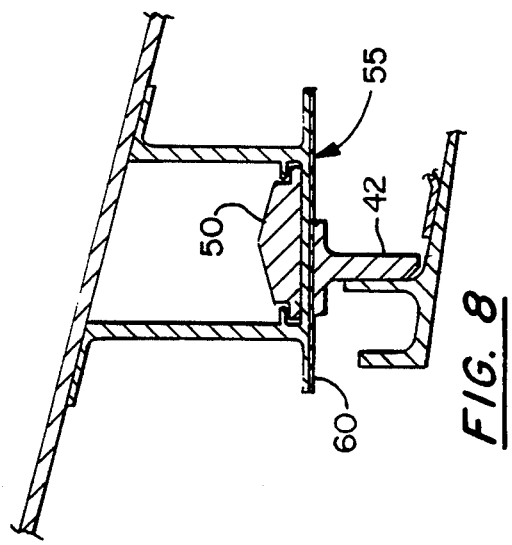
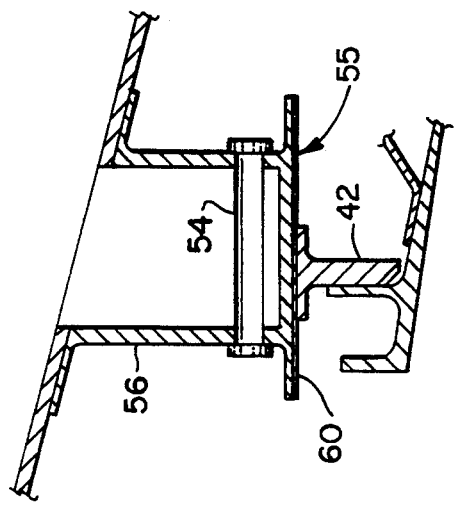
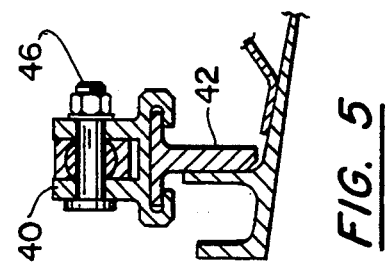
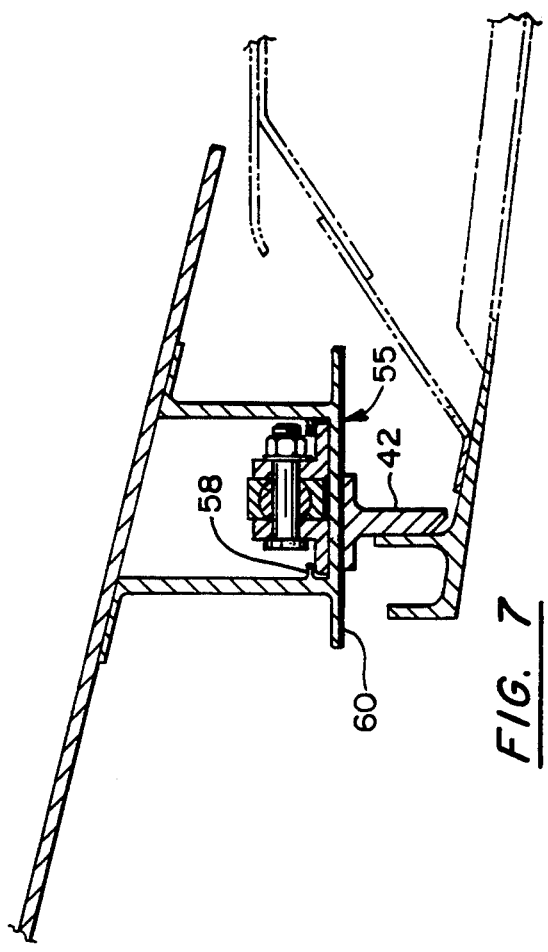

5,350,136

NACELLE ARRANGEMENT

TECHNICAL FIELD

The invention relates to aircraft engine nacelles and in particular to a cowl latch band system at the rear end of the fixed structure facilitating cowl/engine load sharing.

BACKGROUND OF THE INVENTION

Gas turbine engines are mounted on an aircraft by a support structure such as a pylon. A nacelle encloses the engine forming an enclose shelter which is aerodynamically contoured to reduce drag during aircraft operations. The nacelle usually is supported in part from the pylon and in part from the engine.

This nacelle has a removable metal and or composite covering known as a cowling. The cowling includes a fan duct reverser or outer cowl and a core or inner cowl. Each of the cowlings has a pair of clam shell doors hinged at the top. Each door may then be opened to provide access to service the engine.

The larger diameter outer cowling and the smaller diameter inner cowling have in the past often been axially split. Accordingly, hinge lines could be placed on the top of each cowling for opening the clam shell doors.

Recently, however, designs have been used with the inner cowling having the front end attached at the inside of the outer cowling and being supported therefrom. This provided additional stiffness for the nacelle and permitted the inner nacelle to bear against the engine and share loads. This limited the bending of the engine reducing distortion of the casing and rubbing of the blades. It follows that the two cowlings must be open together around a hinge line established by the outer cowling. The inner cowling then rotates around a hinge point which is not located on the cowling itself.

The inner cowling door must be tightly secured against the engine after being closed in order to provide the desired amount of load sharing. One way is to attach the doors at the top to the support structure while also latching the two doors together at the bottom. A top mounted latch is difficult to reach by people on the ground because of the size and location of present day aircraft engines. Some alternate designs have evolved, with these also latching in an upper quadrant. These all have the same difficulty of access. Planes have flown with the cowl latches not being closed because of the inability to reach or see that these latches are engaged. This results in excessive deflection of the engine and rubbing of the blades, thereby reducing performance efficiency and shortening the engine life.

U.S. Pat. No. 4,549,708 introduces a cable arrangement operable from the bottom of the cowling, remotely actualing latching and unlatching to the support structure. A cable located within the surrounding cowling is used to maintain engagement of the latch and the tensile load. When load is released on this cable a spring within the latch mechanism disengages the latch from the support structure. The latch therefore is free to ride with the cowling as the clam shell doors open. On closure the latch is placed adjacent the pin to be grabbed and closed as tension is placed on the cable.

Implementation of the arrangement has not been fruitful because the cable must be lubricated and it binds as the lubricant cokes up. A guide within the hat section is required because of the inability of the cable to take any compressive load. The arrangement depends on a spring to unlatch and has the potential of hanging up at a time when it is desired to open the door. It also has a limited load capability.

SUMMARY OF THE INVENTION

A support structure carries an outer cowl formed of two outer clam shell doors. Each outer door is hinged to the support with hinges in an axially extending row, this row being referred to as an axially extending axis. Two inner cowl clam shell doors are concentrically supported from and within the outer cowl. They extend aft of the outer cowl. As the clam shell doors are all opened the inner cowl clam shell doors are carried on the outer doors, and pivot around the axially extending axis of the outer cowl.

An engine is centrally located within these cowls. The engine has a load share surface at the outer periphery toward the aft end which is engagable with a load share surface on the inner cowl. A latch band on each of the inner cowl doors is arranged to maintain the load share surfaces in preloaded contact when the cowls are in the closed position. A latch band anchor is located on the top of the engine with the latch band secured to this anchor.

The top of each latch band is comprised of an arcuate upper latch pivotally secured to the anchor. This upper latch is circumferentially slidable in the cowl and of a structure capable of taking compressive loading without buckling.

A lower latch is pivotally secured to the upper latch and also circumferentially slidable in the cowl and capable of taking some compressive load. It extends into a lower quadrant where the lower latch may be secured preferable to a hat structure in the cowl. The two cowls are latched together at the bottom.

With a closed cowl the tensile load path passes from the upper anchor through an upper latch on one side and a lower latch, and through the hat structure of one clam shell door. Thence through a bottom latch to the other clam shell door through the hat structure and up through the lower and upper latches on the other door back to the anchor.

On opening of the cowl the latch band remains secured to the anchor. It circumferentially slides around the clam shell door. It is compressively loaded to be forced back in when the door closes.

BRIEF DESCRIPTION OF THE DRAWINGS

FIG. 5–9 are sectional views through the latch assembly of FIG. 4.

DESCRIPTION OF THE PREFERRED EMBODIMENT

Figure 1:
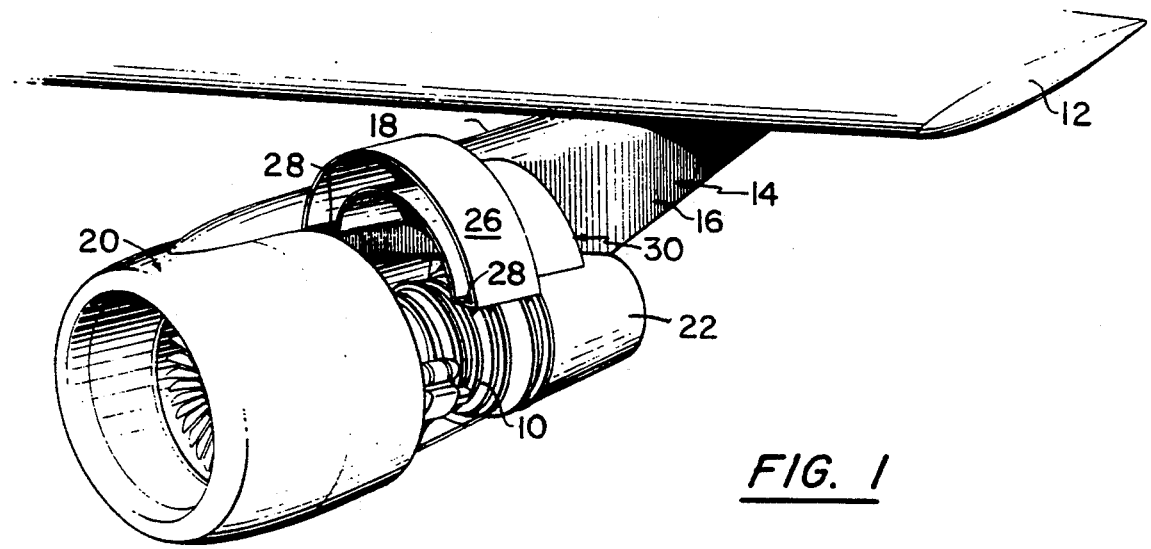
FIG. 1 is an isometric view of a mounted nacelle.

The turbine 10 of the axially flow, turbo fan type is shown in FIG. 1. Wing 12 of an aircraft extends above the engine. The wing includes a pylon or support structure 14 which engages the engine. The pylon has a first side 16 and a second side 18. A nacelle 20 circumscribes the engine and assists the pylon in both supporting and positioning the engine in the aircraft wing.

Figure 2:
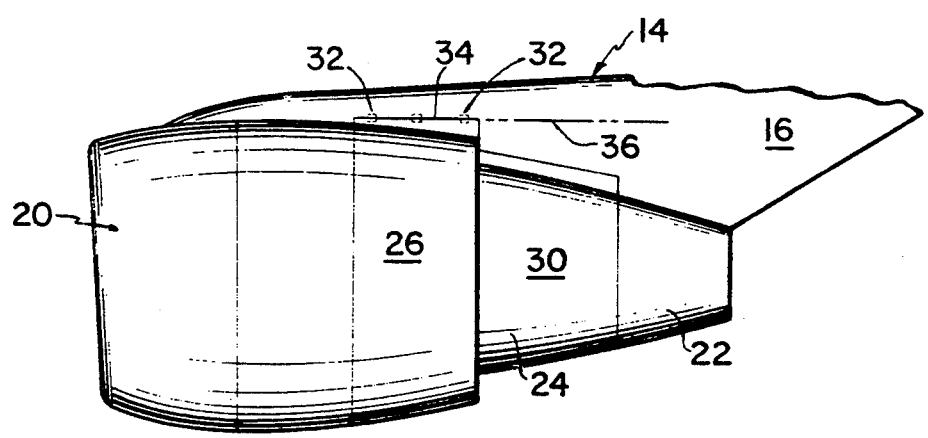
FIG. 2 is a side view of a nacelle.

As shown in FIGS. 1 and 2 the nacelle 20 has an after body 22 at the aft end which does not open. It has a hinged inner cowling 24 and a hinged outer cowling or reverser cowling 26. Walls 28 connect the two cowlings at the upstream end of the inner cowling with the inner cowling extending aft of the outer cowling 26.

Hinges 32 are in axial alignment forming hinge line 34 with an extension 36 of this hinge line shown. As the clam shell doors of the cowls are opened the doors 26 open around hinge line 32. They carry the inner cowl 30 which must also open around the same axis which is essentially hinge line extension 36. It is this rotation around a point outside of the structure of the inner cowl 30 that creates a problem with respect to the operation of latch band 38. The function of this latch band is to maintain the cowling in tight contact with the engine through load share surfaces.

Figure 3:
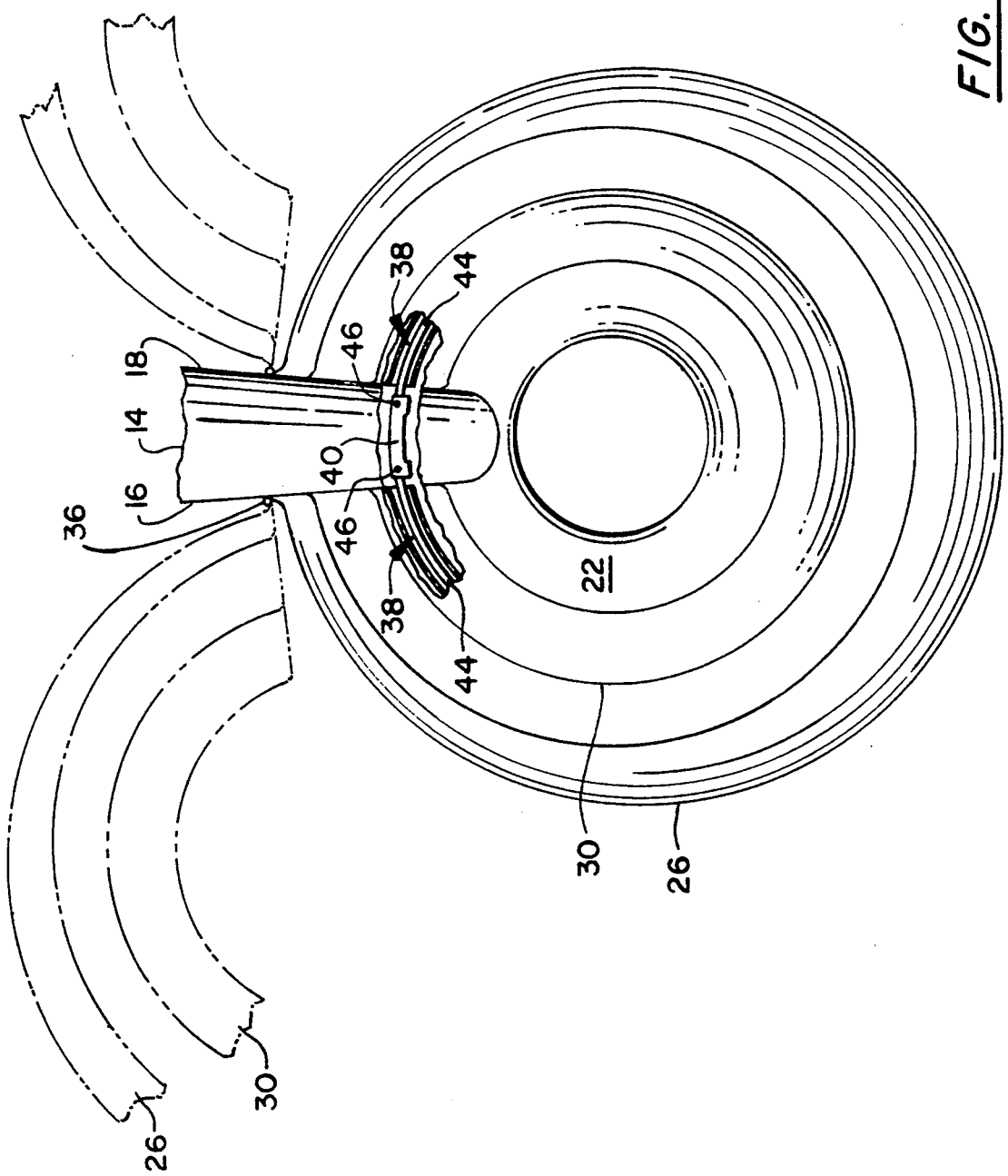
FIG. 3 is a sectional end view of a nacelle with an open position in phantom.

FIG. 3 is a sectional end view of the nacelle showing the location of the latch band 38 secured to anchor or saddle 40. The operation through the opening and closing of the clam shell doors around hinge line 36 is shown.

Figure 4:
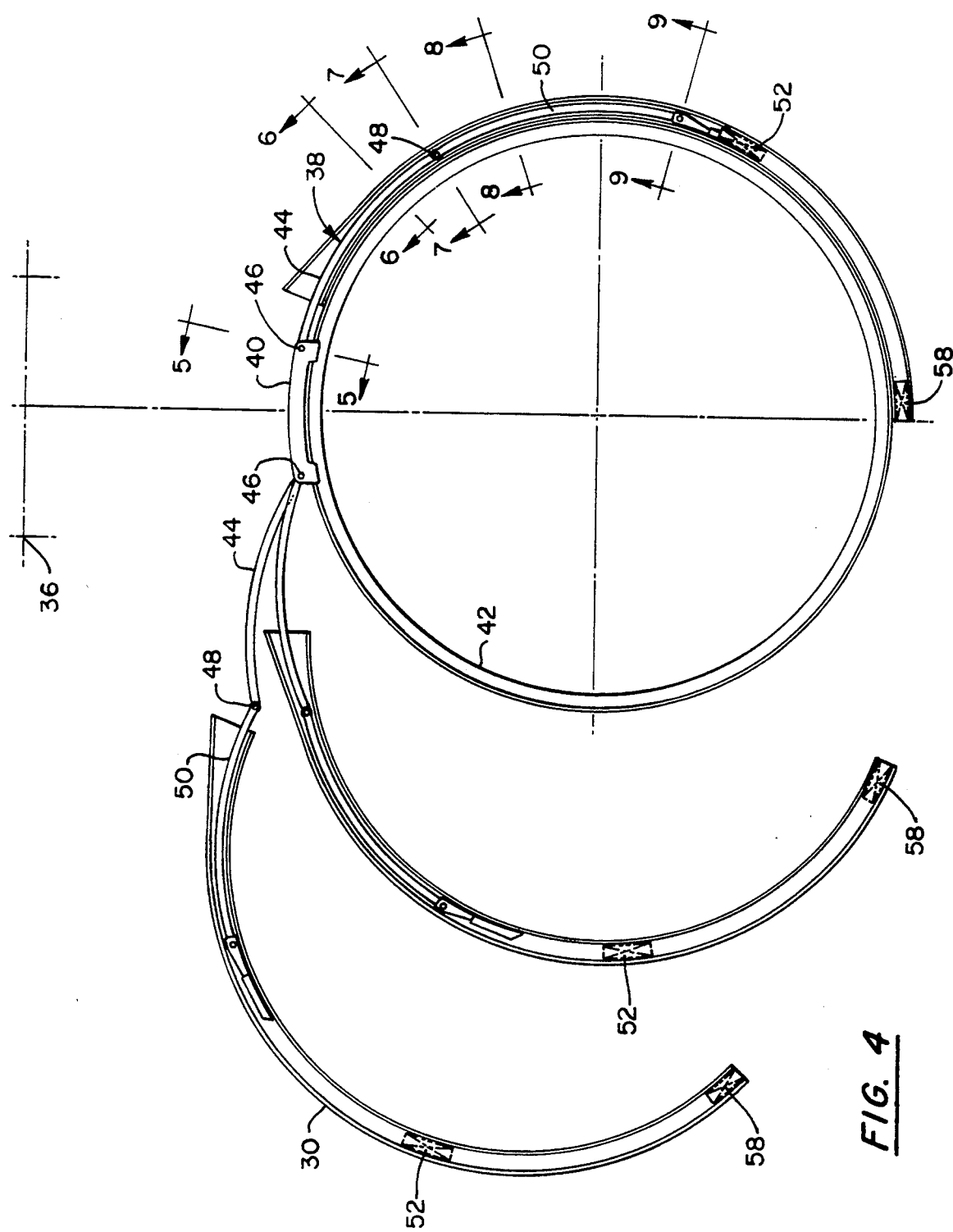
FIG. 4 is a sectional view of the latch band assembly showing the opening sequence.

A saddle 40 is secured to T-ring 42 (FIG. 5) of the engine. A limited amount of sliding of the saddle with respect to the T-ring is permitted at this location to accommodate relative twisting due to internal engine torque between the engine and nacelle. This motion is blocked by stops permitting a movement of 2 cm. Arcuate upper link 44 of the latch band is pivotally secured at pivot 46 to the saddle. Referring to FIG. 4 this extends down to a second pivotal connection 48 where it is joined with a lower arcuate link 50. This lower link extends into the lower quadrant where latch 52 is arranged to engage pin 54 for placing the latch band in tension.

The forward end of the nacelle fits within a circumferential V-groove of the engine. Abutment of the T-ring 42 of the engine and the nacelle at the latch band location causes the nacelle to share load, deterring bending of the engine. The load share surface 55 (FIG. 7) carrying wear surface 60, permits axial engine growth while resisting bending of the engine. Pin 54 transfers this tensile circumferential load to hat section 56. It passes through this structure to the lower latch 58 which joins the two clam shells together.

FIG. 5 is a section showing the connection of the upper latch band to the latch band anchor while FIG. 6 illustrates the connection of the latch 52 to the hat section 56.

FIG. 7 is a section 7—7 showing the connection between the upper link and the lower link and also showing the protrusions 58 on the hat section. These protrusions help maintain this band within the inner diameter of the hat section when it is under compression during closing of the doors. T-ring 42 is shown here where it slidably bears against the wear surface 60 of the hat section.

FIG. 8 shows a cross section through the upper link 44 which has an extremely stiff cross section around bending in either direction as required during closing of the clam shell door.

FIG. 9 shows a section 9—9 through the lower link 50 where in the interest of saving weight the band is less stiff in the circumferential bending direction.

Referring to the phantom views on FIG. 3 the clam shell door 30 is shown opening by rotation around pivot axis 36. Lower latch 58 (FIG. 4) and side latch 52 are first disconnected. As the clam shell door opens, the upper link 44 remains connected at pivot point 46 to the saddle 40. The upper and lower links slide circumferentially within the cowl with the pivot point 48 actually moving outside the cowling at the full open position.

On closing the door, the band must accept some compressive loading without buckling so that it slides down the band latch. The band latch 52 and there after the bottom latch 58 is closed. The door is now secure and all latches are visible from below for ascertaining that they are closed.

The forward end of the nacelle fits within a circumferention V-groove of the engine. Abutment of the T-ring 42 of the engine and the nacelle at the latch band location causes the nacelle to share load, deterring bending of the engine. The load share surface 55 (FIG. 7) carrying wear surface 60 permits axial engine growth while resisting bending of the engine.

We claim:

1. A nacelle arrangement comprising:
   a support structure;
   an outer cowl, formed of two clamshell doors, each hinged to said support with hinges having axially extending axes;
   two inner cowl clamshell doors concentrically supported from and within said outer cowl, and extending axially rearward of said outer cowl, whereby said inner cowl clamshell doors pivot around said axially extending axis on opening and closing, and having two upper quadrants and two lower quadrants;
   an engine centrally located within said inner and outer cowls;
   a latch band on each of said inner cowl doors;
   a latch band anchor on said engine at the top thereof;
   said latch band comprising an arcuate upper link pivotally secured to said anchor, a lower link pivotally secured to said upper link, circumferentially slidable in said cowl and extending into a lower quadrant when said cowl is in the closed position; and
   a latch secured to each lower link in a lower quadrant for placing said link in tension.

2. A nacelle arrangement as in claim 1, further comprising: an engine load share surface around the outer periphery of said engine at a location aft of said outer cowl;
   a cowl load share surface around the inner periphery of said inner cowl mateable with said engine load share surface; and
   said latch band on each of said inner cowl doors comprising a latch band for maintaining said engine load share surface and said cowl load share surface in preloaded contact when said cowls are in the closed position.

3. A nacelle arrangement as in claim 2, further comprising:
   said arcuate upper link having a stiff cross section around bending in either direction.

* * * * *